Feb. 1, 1938.   R. H. GORDON   2,106,706
CONVEYER MECHANISM
Filed Feb. 14, 1935   3 Sheets-Sheet 2
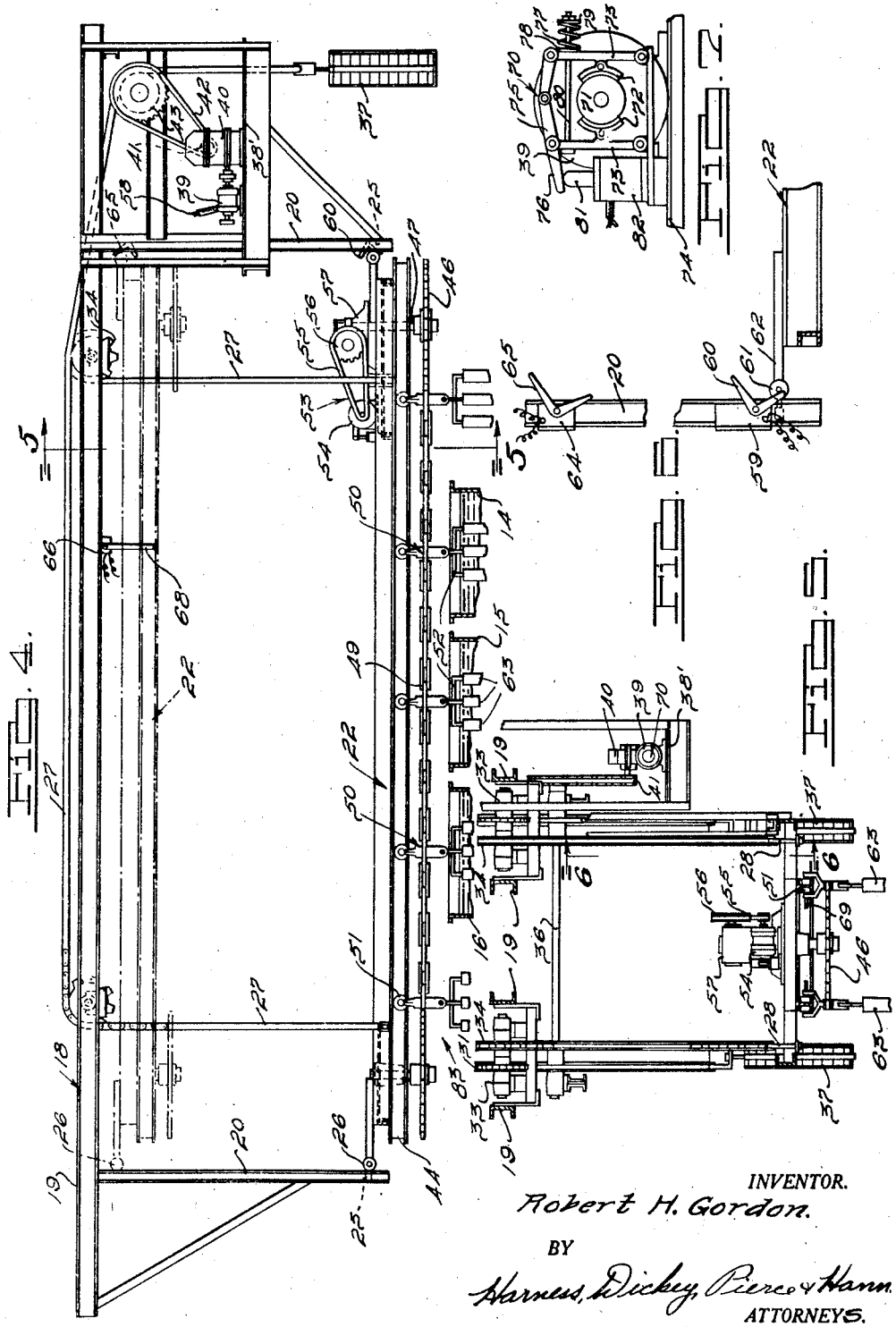
INVENTOR.
Robert H. Gordon.
BY
Harness, Dickey, Pierce & Hann
ATTORNEYS.

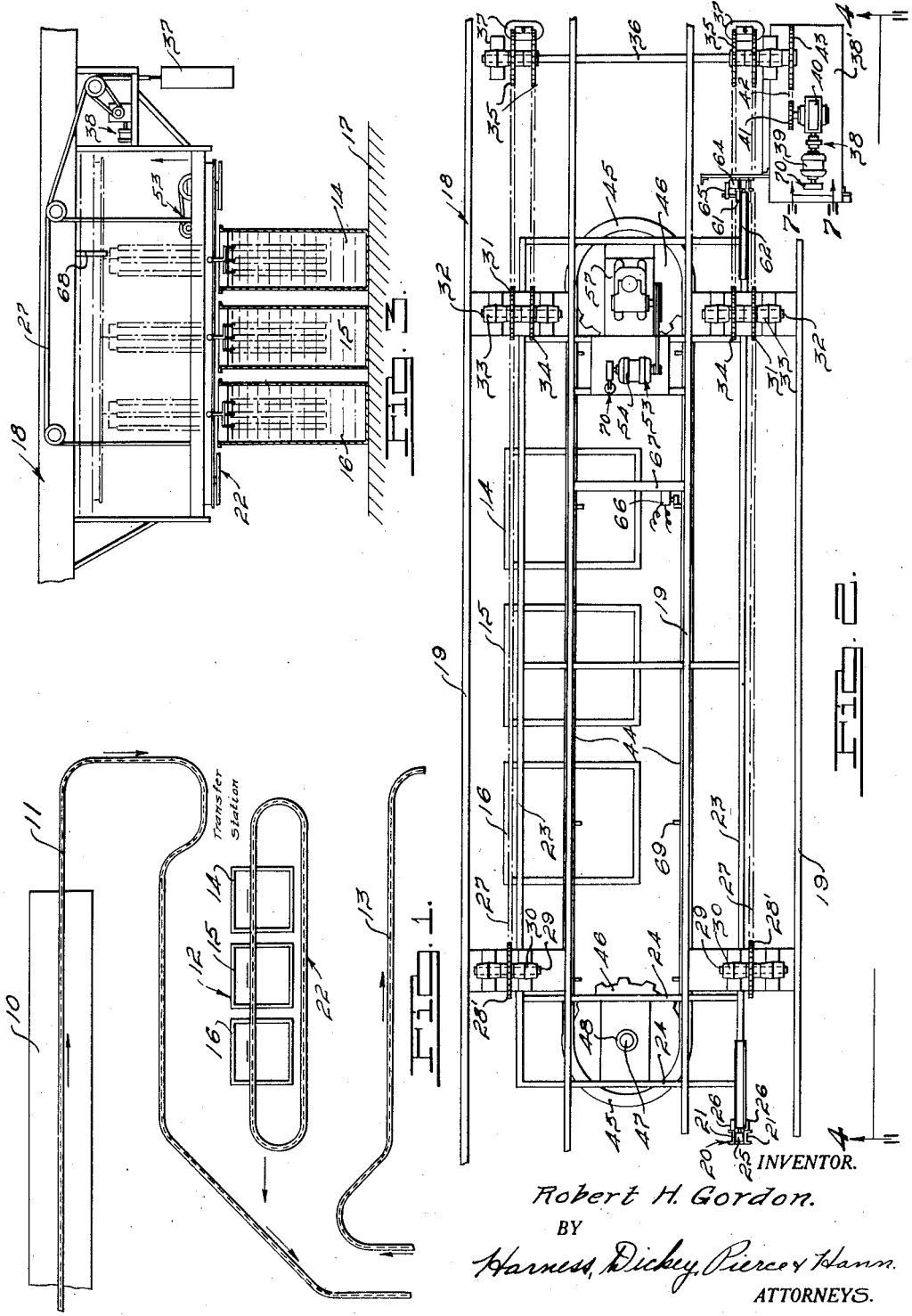

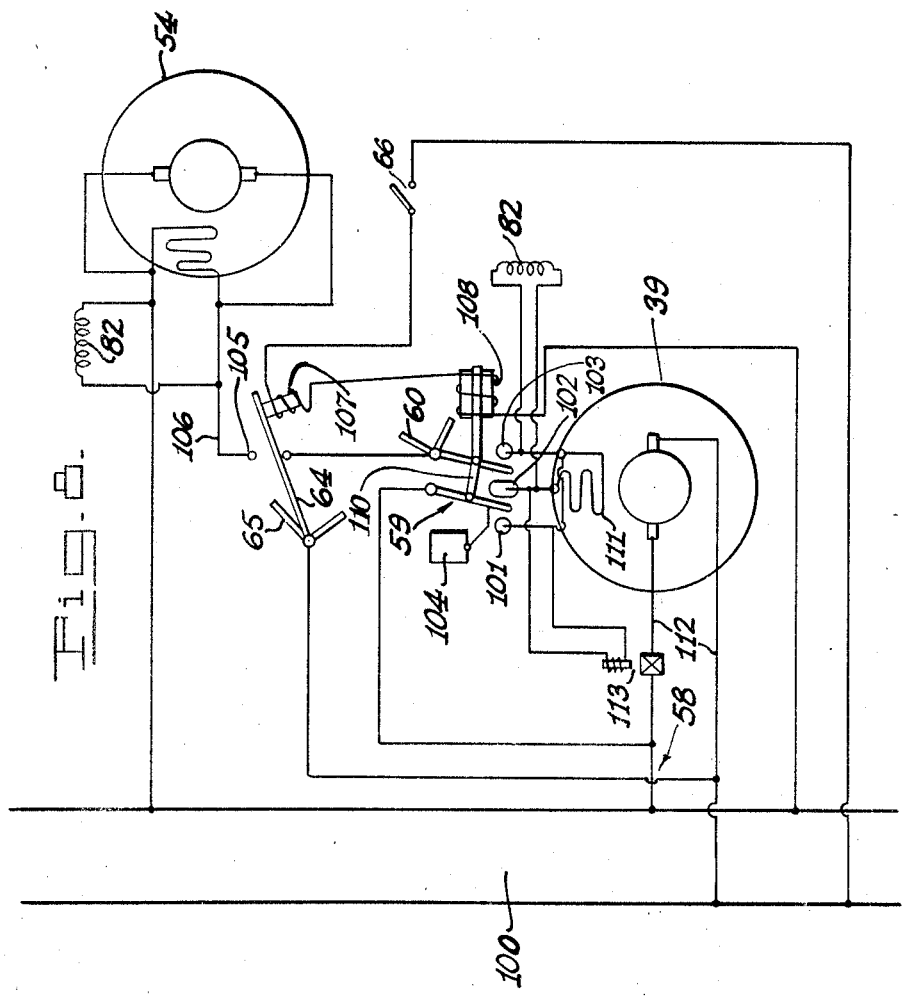

Patented Feb. 1, 1938

2,106,706

UNITED STATES PATENT OFFICE 2,106,706

CONVEYER MECHANISM

Robert H. Gordon, Detroit, Mich., assignor to Parker Rust Proof Company, a corporation of Michigan Application February 14, 1935, Serial No. 6,418

17 Claims. (Cl. 214—17)

This invention relates to conveying mechanism and particularly to that type thereof which is adapted to transport articles to be treated or worked upon intermittently through successive treating or working stations.

Although the mechanism provided by the present invention is applicable for use wherever it is desired to transfer and/or treat in any manner any type of articles, for the purpose of simplicity only reference will hereinafter be made to its application to a rust proofing treatment only for articles such as parts of automobiles, its application for other uses such as in plating, painting, forming, heating treating, baking or the like, and for other types of articles, and the modification of the illustrative embodiments shown to adapt it to such other uses and/or articles will be apparent to those skilled in the art upon the disclosures herein.

The invention pertains to the provision of means particularly applicable for conveying articles to be rust proofed through the various stages of a rust proofing process.

One of the main objects of the invention is to provide improved automatic conveying mechanism for subjecting articles to treatment at successive stations of treating or working apparatus.

A further object of the invention is to provide conveying mechanism of this kind which retains the article substantially at rest throughout the periods they are treated or worked upon in the various stations of the apparatus.

Another object of the invention is to provide means in conveying mechanism of this character for moving articles into and out of treating or working stations, such as tanks in the case of rust proofing operations, in directions substantially perpendicular to the general direction of movement of the articles by the main portion of the conveying mechanism.

A still further object of the invention is to provide means of this kind in conveying mechanism which move the articles into and out of treating or working stations in directions substantially depth-wise of the latter so as to enable the treatment of articles in relatively small tanks or stations and to accommodate the arrangement of a plurality of suitable stations in a comparatively small floor space.

An additional object of the invention is to provide means in conveying mechanism of this character which is adapted to simultaneously support a plurality of articles, or series of articles, in different treating stations respectively, and to simultaneously advance each article or series of articles, from one station to the next successive station, respectively.

Other objects of the invention are to provide an elevating and lowering unit by which a plurality of articles, or series of articles, may be simultaneously raised and lowered and intermittently moved horizontally a predetermined distance while in their elevated position; to provide a vertically movable support of this kind having self-contained mechanism for propelling articles horizontally thereon; to provide completely automatic control mechanism for operating said support and said horizontal article propelling mechanism in a predetermined timed relation; to provide means in control mechanism of this character which is responsive to movement of the supports and also responsive to the elapse of a selected length of time for predetermining the periods the support is allowed to remain in its lowermost position and the duration of the treatment of the articles carried thereby; to provide means responsive to movement of said support to its uppermost position for simultaneously interrupting upward movement thereof and initiating the horizontal movement of the articles; to provide means in control mechanism of this character which is responsive to horizontal advancement of the articles and adapted to terminate such advancement and to simultaneously initiate downward movement of said supports when the articles have been moved horizontally throughout a selective distance, preferably sufficient in length to move the articles from a vertically registering position with respect to one station to a vertically registering position with respect to the next successive station; and to provide means for automatically interrupting the downward movement of said supports at its lowermost position and for conditioning said control apparatus for a subsequent cycle of operation.

Further objects of the invention are to provide a conveying system by which articles can be lowered into and lifted out of one station or container and propelled into position for introduction into and withdrawal from another station or container respectively in progressive sequence with ample precision of movement to avoid engagement of the articles with all portions of the station walls or containers and other associated structures of the working or treating apparatus and conveying mechanism; to provide conveying mechanism of this kind which is so constructed and arranged as to enable automatic accomplishment of the foregoing result with the aid of relatively simple and inexpensive structural and control parts.

The above being among the objects of the present invention, the same consists in certain novel features of constructions and combinations of parts to be hereinafter described with reference to the accompanying drawings and then claimed, having the above and other objects in view.

An illustrative embodiment of the invention is shown in the accompanying drawings, wherein:

Fig. 1 is a diagrammatic, illustrational plan view of a system for conveying articles through the various stages of a rust proofing process.

Fig. 2 is an enlarged, fragmentary plan view of that portion of the conveying mechanism which is constructed and arranged to intermittently raise and lower and horizontally transport articles from one treating or working station to another.

Fig. 3 is a reduced, fragmentary side elevational view of the tanks and conveyer mechanism shown in Fig. 2, the tanks being shown in vertical section.

Fig. 4 is a fragmentary side elevational view showing the structure disclosed in Fig. 2 as it appears from the line 4—4 thereof.

Fig. 5 is a transverse, vertical sectional view taken on the line 5—5 of Fig. 4.

Fig. 6 is a fragmentary, longitudinal vertical sectional view taken on the line 6—6 of Fig. 5.

Fig. 7 is an enlarged side elevational view showing the brake mechanism illustrated in Fig. 2 as viewed from line 7—7 thereof.

Fig. 8 is an illustrational view showing one wire diagram for electrically connecting the control and actuating parts of my improved apparatus.

In Fig. 1 of the drawings is illustrated an embodiment of the improved conveying mechanism in rust proofing apparatus which generally includes a preliminary washing station 10 at which articles to be rust proofed are subjected to suitable washing operations either by manual or mechanical application thereto of water or other suitable cleaning agents. Extending through the washing station 10 is a suitable conveyer section 11, shown for the purpose of illustration as comprising a mono-rail system, although any conventional conveying device may be used for this purpose. The conveyer section 11 is preferably loaded at or before the left end of the washing station 10 and it is constructed and arranged to transport articles therefrom to the inlet, or right end of the rust proofing unit, generally designated by the numeral 12 in Fig. 1. The conveying section 11 is of the endless conveyer type, and it has a return portion (not shown) leading back to the entrance of the washing station 10. A second conveyer section 13, also of the endless type, is provided for transporting articles away from the discharge or left end of the rust proofing unit 12, as viewed in Fig. 1.

The rust proofing unit 12 comprises a longitudinally arranged series of solution tanks in which is provided a suitable solution for each step of the rust proofing treatment. In the apparatus illustrated there are included three tanks 14, 15 and 16, respectively, which may contain a rust proofing solution, a cold water rinse and a chrome solution. Each of the tanks 14, 15 and 16 has an open upper end and they all have relatively short lateral dimensions and sufficient depth to accommodate articles of a predetermined length. The tanks 14, 15 and 16 are supported by a floor 17, or other suitable supporting structure, above which is provided an over-head supporting structure, generally designated by the numeral 18, which includes longitudinally extending beams 19 having rectangularly spaced downwardly extending and substantially vertical guides 20. Each vertical guide 20 comprises a pair of spaced channel members 21 having their webs arranged in facing relationship with respect to each other to provide a restricted guide slot therebetween.

Slidably mounted on the over-head frame structure 18 is a vertically reciprocable support, generally designated by the numeral 22, which includes a substantially horizontal frame structure comprising a pair of longitudinally extending channel beams 23 rigidly connected together by a plurality of longitudinally spaced transverse channels 24. The extremities of each longitudinally extending channel beam 23 is provided with an outwardly extending shoe 25 which is engaged between the channel members 21 of one of the vertical guides 20, respectively, for holding the vertically shiftable support 22 against lateral movement. Journaled on each end portion of the longitudinal channel beams 23 of the vertical shiftable support 22 are a pair of rollers 26, each of which is disposed in rolling contact with a flange of one of the channels 21 of each vertical guide 20, respectively, so as to hold the vertically shiftable support 22 against longitudinal movement in either direction without excessively resisting the vertical movement thereof.

The vertically shiftable support 22 is held in suspended relation from the frame structure 18 by four flexible chains 27, each of which is rigidly attached to a corner portion of the frame structure of the support 22 by a U-shaped strap 28, best shown in Fig. 5. The left end pair of chains 27 extend upwardly and over sprocket wheels 28' carried by relatively short shafts 29 which are journaled in bearings 30 mounted on the overhead frame structure 18. Each of these chains then extends substantially horizontally over a sprocket wheel 31 carried by a relatively short shaft 32 which is journaled in bearings 33, respectively, mounted on the over-head supporting structure 18. Each of the chains 27 of the right end of the support 22, as viewed in Fig. 4, extends upwardly and passes over a pinion 34 carried by one of the shafts 32, respectively, as illustrated in Figs. 2 and 4. The right end portions of the chains 27 of each respective longitudinal side of the vertically shiftable support 22 are engaged on driving sprocket wheels 35 rigidly fixed to a transversely extending shaft 36 and the extremities thereof are connected to a common counterweight 37, respectively. The counterweights 37 are predetermined in weight to substantially balance the weight of the shiftable supports 22, all of the apparatus carried thereby and a predetermined article load.

The energy required to raise and lower the shiftable support 22 is supplied by driving mechanism, generally designated by the numeral 38 in Fig. 2, and mounted on a platform 38' fixed to the over-head supporting structure 18, and the driving mechanism includes a reversible motor 39 operatively connected to transmission mechanism 40. The transmission mechanism 40 is preferably of the speed reducing type and it is provided with a shaft having a sprocket wheel 41 thereon that is operatively connected by a chain 42 with a sprocket wheel 43 fixed to one end of the transverse shaft 36.

Mounted on the transverse bars 24 of the frame structure of the shiftable support 22 are spaced longitudinally extending conveyer rails 44, one of which is arranged substantially in the longitudinal central vertical plane of the series of tanks 14, 15 and 16. The ends of the rails are connected together by substantially semi-circular rail sections 45 so as to provide an endless looped mono-rail track. A substantially horizontally disposed sprocket wheel 46 is provided at each end of the looped track and rotatably supported by a shaft 47 journaled in bearings 48 carried by the frame structure of the vertically shiftable support 22. The sprocket wheels 46 are located directly below the semi-circular rail sections 45 of the horizontal conveyer and their diameters are substantially equal thereto. An endless conveyer chain 49 extends around the sprocket wheels 46 and its side portions are supported substantially in vertical alignment with the rails 44 by carriages, generally designated by the numeral 50 in Fig. 4. Each carriage 50 has a yoke-shaped upper end portion between the opposite sides of which are mounted rollers 51. The rollers 51 are rotatably mounted on the carriage 50 and disposed in rolling contact engagement with opposite side portions of the lowermost flange of the rails 44. The intermediate portions of the carriages 50 are fixed to longitudinally spaced links of the chain 49 and the lower end portions thereof are provided with article holders 52 by which one, or a series of articles, may be detachably supported. The carriages 50 are preferably equally spaced apart a distance substantially equal to the distance between the centers of the tanks 14, 15 and 16 and the article holders 52 are preferably so constructed and arranged that when one carriage 50 is disposed over the central portions of one of the tanks, a number of articles, or series of articles, corresponding to the number of tanks, will be centrally located with respect to one of the tanks respectively.

The conveyer chain 49 is provided with driving mechanism, generally designated by the numeral 53, which is supported independently by the vertically shiftable support 22. This driving mechanism includes a motor 54 which is operatively connected by a chain 55 with a sprocket wheel 56 of a reduced speed transmission 57 by which is driven the vertically disposed shaft 47 on which the right hand conveyer sprocket 46 is mounted.

Intermittent raising and lowering of the vertically shiftable support 22 and intermittent horizontal movement of the article holders 52 by the driving mechanism 53 is controlled by suitable circuits having switches therein for properly energizing and deenergizing the motors 39 and 54 in a predetermined sequence. The pinion 41 of the transmission 40 is adapted to be driven in respectively opposite directions by the reversible motor 39 under the control of a reversing circuit 58, a fragmentary part of which is illustrated in Fig. 4 which is electrically connected with a timing switch 59 mounted on one of the vertical guides 20 of the right end of the over-head supporting structure 18, as illustrated in Fig. 6. The switch 59 has a bell-crank operating member 60 comprising angularly spaced arms both of which are disposed in the path of movement of a roller 61 journaled on a bar 62 extending outwardly from the right extremity of the shiftable support 22, as viewed in Fig. 4. The control member 60 of the switch 59, shown in Fig. 6, is rotated in a clockwise direction by engagement of the rollers 61 with the lower arm thereof during downward movement of the vertically shiftable support 22 so as to interrupt the supply of current to the motor 39 for a predetermined length of time established by conventional timing mechanism with which the switch 59 is provided. After the lapse of the period of time during which the circuit 58 of the motor 39 is open, the timing mechanism of the switch 59 completes that branch of the circuit 58 which causes the motor 39 to be driven in a direction corresponding to clockwise rotation of the sprocket wheel 41 of the transmission 40, as viewed in Fig. 4. This direction of rotation of the transmission causes the vertically shiftable support 22 to be elevated thereby removing from the tanks 14, 15 and 16, all of the articles, diagrammatically illustrated at 63, which have been under treatment therein.

A switch 64 having a bell-crank type of operating member 65 is mounted on the same vertical guide member 20 as the switch 59 and is disposed in vertical alignment therewith. The uppermost arm of the operating member 65 is engageable by the roller 61 during upward movement of the shiftable support 22 for the purpose of deenergizing the motor 39 and interrupting upward movement of the support 22 when the latter reaches a predetermined elevation. This action is accomplished by counter-clockwise rotation of the control member 65 of the switch 64. The latter switch is adapted to close the circuit of the motor 54 of the horizontal conveying mechanism simultaneously with the opening of the circuit of the motor 39. The circuit of the motor 54 of the horizontal conveying mechanism is provided with a switch 66 which is mounted on a transversely extending bar 67 carried by the rails 19. The switch 66 has a downwardly extending pivotally mounted control lever 68 which is engageable by pins 69, one carried by each carriage 50. The switch 66 is also electrically connected in that branch of the circuit of the motor 39 which when closed causes counter-clockwise rotation of the sprocket wheel 41 of the transmission mechanism 40. When the control lever 68 of the switch 66 is rotated in a clockwise direction, as viewed in Fig. 4, by engagement therewith of a pin 69 of one of the carriages 50, the circuit of the motor which establishes counter-clockwise rotation of the transmission sprocket wheel 41 is closed and the circuit of the motor 54 of the horizontal conveying mechanism is open so as to discontinue horizontal movement of the articles and simultaneously initiate downward movement of the shiftable support 22.

In order to facilitate prompt termination of both vertical movement of the support 22 and/or horizontal movement of the conveyer carried thereby, both or either of the motors 39 and 54 may be provided with automatic braking apparatus generally designated by the numeral 70, of the character illustrated in Fig. 7, which includes a brake drum 71 securable to a motor shaft and associated brake shoes 72. The brake shoes are pivotally supported by vertically upstanding levers 73, each of which is pivotally mounted at its lower end to a base structure 74 or other suitable support. The upper ends of the vertically upstanding levers 73 are pivotally connected together by toggle mechanism 75, one arm of which has an outwardly projecting extension 76 which serves as a brake operating lever. The upright levers 73 and brake shoes 72 carried thereby are resiliently urged together by a coil spring 77 which bears between a plate 78 on the right hand lever 73 and a plate 79 fixed to the end of a cross rod 80, which is slidably mounted in an aperture formed in the plate 78 and secured to the left hand lever 73, as illustrated in Fig. 7. The spring 77 normally yieldably holds the brake shoes 72 in an applied condition and the brake shoes are adapted to be released by the action of a plunger 81 of a solenoid 82, the plunger 80 bearing upwardly upon the operating lever 76 so as to rotate the latter in a clockwise direction, as viewed in Fig. 7, when the solenoid is excited. The solenoid is electrically connected in the circuit of the motor with which the brake mechanism is associated such as the circuit 58 of the motor 39 for example, so as to be excited simultaneously with excitation of each branch of the circuit 58. When driving of the motor in either direction is discontinued the solenoid is de-energized and the brake shoes 72 are applied to promptly stop rotation of the motor shaft and transmission 41, with which it is drivingly connected, the brake shoes being held by the action of the solenoid 82 in released positions while the motor is operating in either direction.

One illustrational wire diagram by which the foregoing actions may be automatically obtained is shown in Fig. 8, in which 100 designates a direct current power line circuit in which the reversing motors 39 and the motor 54 are electrically connected. The reversing motor 39 is preferably controlled by the combined reversing and timing switch 59 and is provided with three terminals 101, 102, 103 of which the outer terminals 101 and 103 are electrically connected together. Movable contacts of the switch 59 are connected with the line 100 by conductors 109 and they are so disposed as to connect either terminals 101 and 102 or 103 and 102 with the direct current line 100. This action may be obtained by pivotally mounting each movable contact at its upper end as viewed in Fig. 8 and pivotally connecting the same together intermediate their ends by a link 110, the terminals 101, 102 and 103 being so arranged as to engage the lower ends of the movable contacts in the above described order when such contacts are at the respectively opposite limits of their movement. Since the terminals 101 and 103 are both electrically connected to one terminal of the field coil 111 of the reversible motor 39 and terminal 102 is connected to the other field terminal when the movable contacts engage terminals 101 and 102, current is passed in one direction through the field winding. When the movable contacts engage terminals 102 and 103 the direction of current flow in the field coil is reversed and, accordingly, the direction of operation of the motor 39 is reversed.

The armature of the motor 39 may be constantly excited by conductors 112, which circuit may, if desired, be interrupted when the movable contacts are out of engagement with the terminals 101, 102 and 103, in order that the armature will not be supplied with current when the field 111 is not excited. This can be accomplished by including a solenoid switch 113 in one of the conductors 112 leading from the line 100 to the armature, the winding of the solenoid switch 113 being connected to the terminals of the field coil 111 so that when the field coil is excited by current flowing in either direction the switch 113 is closed, and when the field coil is not excited, the switch 113 is open.

In the illustration shown, the movable contacts have just been disengaged from terminals 102 and 103 by clockwise rotation of the control lever 60 of the switch 59 to stop downward movement of the platform 22 and after a predetermined time period the timing mechanism, diagrammatically shown at 104, will bring the contacts into engagement with the terminals 101 and 102 thereby starting upward movement of the platform by energizing the field 111 with current flowing in one direction. This upward movement continues until the switch 64 in a conductor leading to one of the movable contacts opens the circuit of the motor 39. This is accomplished by counter-clockwise rotation of the switch lever 65 which brings the switch 64 into engagement with a contact 105 in the circuit 106 of the motor 54. The motor 54 then causes horizontal movement of the articles carried by the apparatus until the circuit 106 is broken by momentary excitation of a branch control circuit of the reversing motor in which the switch 66 is included. When the switch 66 is momentarily closed by a predetermined distance of horizontal travel of the articles, then solenoids 107 and 108 return the movable contact switch 64 to the position illustrated in Fig. 8 and rotates the movable contacts of switch 59 into engagement with terminals 102 and 103, thereby causing current to flow in an opposite direction through the field 111 and thus reversing the direction of operation of the motor 39 and conditioning the apparatus for another cycle. The solenoids 82 are connected across the conductors leading to the motors 39 and 54 so that each respective solenoid is energized each time the motor with which it is associated is energized, thereby releasing the normally applied brake mechanism associated with the respective motor operated driving units.

In operation, articles are placed upon the conveyer section 11 with the aid of suitable article holders and propelled thereby to a position adjacent the right end of the horizontal conveyer of the shiftable support 22 to which they are manually or mechanically transferred while the horizontal conveyer is in either of its limiting vertical positions. The shiftable support 22 intermittently raises and lowers the articles on the horizontal conveyer simultaneously and retains the articles in their lowermost positions for a predetermined length of time between vertical movements thereof. Those articles 63, or series of articles, which register with the tanks 14, 15 and 16 are held and treated therein during such periods. While the shiftable support 22 is at its upper limit between successive vertical movements thereof, the conveyer 49 propels the articles 63, which are supported by the side of the conveyor that is disposed over the tanks, to the left as viewed in Figs. 1 and 4 a distance substantially equal to the distances between corresponding portions of the tanks so that as the articles are lowered they are advanced in position from one tank to the next adjacent tank during each complete reciprocation of the support 22. The above movements of the articles are automatically controlled and brought about by the foregoing apparatus, with ample precision to avoid contacting of the articles with the sides of the tank, conveying mechanism and the associated supporting structure. The progressive movement of each of a plurality of series of articles successively from one tank to another enables the simultaneous treatment of a large number of articles and by retaining the articles at rest during the treating or working periods it is possible to employ tanks of relatively small cross-sectional dimensions which occupy only comparatively small floor space. After each article or series of articles has been lifted from within the last tank 16 they are transported beyond the latter by the horizontal conveyer to the position illustrated at 83 in Fig. 4 from which they are either manually or mechanically transferred to the conveyer 13 which transports the treated articles to a suitable location for storage or receiving further operations.

Although but one specific form of the invention has been illustrated and described in detail, it will be apparent to those skilled in the art that various modifications may be made without departing from the scope of the appended claims.

What I claim is:

1. Conveying mechanism including a vertically reciprocable support, means including a driving member for reciprocating said support between predetermined limits, conveyer means including a second driving member carried by said support for holding and moving articles horizontally from one position on said support to another position thereon, and control mechanism on both said driving members comprising a control element responsive to downward movement of said support adapted to de-energize said first driving member when said support is at its lowermost position and to maintain the same inoperative for a predetermined period, a control element responsive to upward movement of said support for rendering said first driving member inoperative when said support is at its upper limit and for simultaneously initiating operation of said second driving member, and a control element responsive to horizontal conveyer section for de-energizing said second driving member when said article reaches said last mentioned position on said support and simultaneously initiating downward movement of said support by said first driving member.

2. In apparatus comprising a plurality of adjacent treating stations each having an inlet on a corresponding side, mechanism associated with said stations for successively moving articles from a position within one station to a position within the next successive station respectively including a reciprocable support movable bodily toward and away from said corresponding sides of said stations, and conveyer means having spaced article holders thereon movably mounted on said support and including driving mechanism carried by said support for advancing each of a series of articles from a position on said support registering with the inlet of one station to another position on said support registering with the inlet of the next adjacent station, respectively, between each reciprocation of said support from the limit of movement thereof remote from said corresponding sides of said stations.

3. In apparatus comprising a plurality of adjacent treating stations each having an inlet on a corresponding side, mechanism associated with said stations for successively moving articles from a position within one station to a position within the next successive station respectively including a reciprocable support movable bodily toward and away from said corresponding sides of said stations, conveyer means having spaced article holders thereon movably mounted on said support and including driving mechanism carried by said support for advancing each of a series of articles from a position on said support registering with the inlet of one station to another position on said support registering with the inlet of the next adjacent station, respectively, between each reciprocation of said support from the limit of movement thereof remote from said corresponding sides of said stations, and mechanism including automatic control apparatus having control elements responsive to movement of said support and to movement of said article holders relative thereto respectively for automatically reciprocating said support and operating said article advancing means in a predetermined timed relation.

4. In apparatus comprising a plurality of adjacent treating stations each having an inlet on a corresponding side, mechanism associated with said stations for successively moving articles from a position within one station to a position within the next successive station respectively including a reciprocable support movable bodily toward and away from said corresponding sides of said stations, conveyer means having spaced article holders thereon movably mounted on said support and including a driving member carried by said support for advancing each of a series of articles from a position on said support registering with the inlet of one station to another position on said support registering with the inlet of the next adjacent station, respectively, between each reciprocation of said support from the limit of movement thereof remote from said corresponding sides of said stations, and mechanism including automatic control apparatus having control elements responsive to movement of said support and to movement of said article holders relative thereto respectively for automatically reciprocating said support and operating said article advancing means in a predetermined timed relation, said control apparatus being adapted to retain said support at rest at its other limit so as to subject said articles to treatment of a predetermined duration in said stations.

5. In apparatus comprising a series of adjacent treating stations, mechanism associated with said stations including a reciprocable support movable bodily outwardly from said stations, conveying means including a driving member on said support movable longitudinally of said series of stations for movably supporting a series of articles in spaced relation and for simultaneously advancing each of said articles from a position on said support registering with one station to another position on said support registering with the next adjacent station respectively when said support is in its outermost position, an apparatus for holding said means against movement relative to said support when the latter is in all other positions.

6. In apparatus comprising a series of adjacent treating stations having associated entrances thereto, conveying mechanism associated with said stations including a stationary supporting structure, a reciprocable support mounted on said structure and movable bodily away from said entrances, an endless conveyer on said support movable longitudinally of said series of stations and having article holders thereon for supporting a series of articles in spaced relation, mechanism for alternately reciprocating said support and driving said endless conveyer including a driving member for the latter carried by said support and a driving member for reciprocating said support mounted on said stationary structure, an apparatus for holding said conveyer against movement between successive operations thereof.

7. In apparatus comprising a series of adjacent treating tanks having upper open extremities, conveying mechanism associated with said tanks including an endless conveyer having spaced holders thereon for supporting a series of articles in suspended relation in said tanks, a stationary frame structure and means for substantially vertically bodily reciprocably supporting said endless conveyer on said frame structure and adapted to accommodate sufficient upward movement of said conveyer to simultaneously remove said articles from said tanks.

8. In apparatus comprising a series of adjacent treating tanks having upper open extremities, conveying mechanism associated with said tanks including a stationary support disposed thereover, a vertically shiftable support mounted on said stationary support, means including control mechanism responsive to movement of said support for automatically intermittently raising and lowering the latter, means for moving articles horizontally including a conveyer and driving member therefor carried by said shiftable support and having article holders thereon spaced longitudinally of said conveyer distances substantially equal to the distances between corresponding portions of said tank and registering vertically with the open extremities thereof, and means including control apparatus responsive to movement of said conveyer for automatically moving said article holders horizontally distances substantially equal to the distances therebetween when said shiftable support is disposed at its upper limit of movement.

9. In apparatus comprising a series of adjacent treating stations, conveying mechanism associated with said stations for moving each of a series of articles successively into and out of said stations in a progressive manner including a reciprocable support, means for reciprocating said support, a conveyer carried by said support for moving said article transversely of the reciprocatory movements of said support, means on said support for driving said conveyor, and interrelated control apparatus for the driving means of said support and the driving means of said conveyer for automatically operating the respective driving means thereof in a predetermined timed relation.

10. In apparatus comprising a series of adjacent treating stations, conveying mechanism associated with said stations for moving each of a series of articles successively into and out of said stations in a progressive manner including a reciprocable support, means for reciprocating said support, a conveyer carried by said support for moving said article transversely of the reciprocatory movements of said support from one position on the latter to another position thereon, means carried by said support for driving said conveyer, and interrelated control apparatus for the driving means of said support and the driving means of said conveyer for automatically operating the respective driving means thereof in a predetermined timed relation, said control apparatus including a member responsive to movement of said support toward one of its limiting positions for maintaining the driving means thereof inoperative for a predetermined elapse of time so as to subject said articles to treatment of a predetermined period in each of said tanks.

11. In apparatus comprising a series of adjacent treating stations, conveying mechanism associated with said stations for moving each of a series of articles successively into and out of said stations in a progressive manner including a reciprocable support, means for reciprocating said support, a conveyer carried by said support for moving said article transversely of the reciprocatory movements of said support from one position on the latter to another position thereon, means carried by said support for driving said conveyer, and interrelated control apparatus for the driving means of said support and the driving means of said conveyer for automatically operating the respective driving means thereof in a predetermined time relation, said control apparatus including a control element responsive to movement of said support toward one of its limiting positions for interrupting such movement and initiating movement of the articles by said conveyer and including a second control element responsive to movement of said conveyer for interrupting the movement thereof after each of said articles have been advanced from a position registering with one tank to a position registering with the next adjacent tank respectively.

12. Conveying mechanism including a vertically reciprocable support, means including a driving member for reciprocating said support between predetermined limits, a conveyer member carried by said support for holding and moving articles horizontally from one position on said support to another position thereon, means including a second driving member for operating said horizontal conveyer section, and control mechanism on both said driving members comprising a control element responsive to downward movement of said support adapted to de-energize said first driving member when said support is at its lowermost position and to maintain the same inoperative for a predetermined period, a control element responsive to upward movement of said support for rendering said first driving member inoperative when said support is at its upper limit and for simultaneously initiating operation of said second driving member, a control element responsive to horizontal conveyer section for de-energizing said second driving member when said articles reach said last mentioned position on said support and simultaneously initiating downward movement of said support by said first driving member, and brake apparatus associated with each of said driving members respectively and operable by said control mechanism for preventing overrunning of the movements of said support and conveyer member.

13. In apparatus comprising a plurality of adjacent treating stations, conveying mechanism associated with said stations for moving articles successively from one station to another including a reciprocable support movable toward and away from said station, a conveyer member including spaced article holders mounted on said support and movable relative thereto in a direction transverse to the reciprocatory movement thereof, means including a driving member for reciprocating said support and a driving member carried by said support for moving said conveyer member and each of its article holders relative thereto between successive cycles of its reciprocatory movement from one position on said support to another position thereon and through a predetermined distance corresponding to the distance from a location in one station to a corresponding location in the next adjacent station respectively, and means operable between successive operations of said conveyer member for holding the latter against movement relative to said support.

14. In apparatus comprising a series of adjacent treating stations, conveying mechanism associated with said stations for moving each of a series of articles successively into and out of said stations in a progressive manner including a reciprocable support, means for reciprocating said support, a conveyer carried by said support for moving said article transversely of the reciprocatory movements of said support, means carried by said support for driving said conveyer, interrelated control apparatus for the driving means of said support and the driving means of said conveyer for automatically operating the respective driving means thereof in a predetermined timed relation, and brake apparatus associated with each of said driving members, respectively, and operable by said control apparatus for preventing overrunning of the movements of said support and conveyer and for holding said conveyer against movement relative to said support between successive operations of said conveyer.

15. Conveying mechanism including a stationary frame structure, a reciprocable support, means for automatically reciprocating said support between predetermined limits during intermittent cycles, and means on said support for holding and automatically moving articles thereon between successive cycles of said reciprocatory movement in a direction transverse to its directions of reciprocatory movement including an endless conveyer carried solely by said support and having holders thereon for retaining articles in suspended relation.

16. Conveying mechanism including a stationary frame structure, a reciprocable support, means for automatically reciprocating said support between predetermined limits during intermittent cycles, an endless conveyer carried solely by said support and having a driving member on the latter for movably supporting articles thereon between successive cycles of said reciprocatory movement, mechanism operable only when said support is at one of said predetermined limits for moving said articles relative to said support, and means for holding said conveyer against movement relative to said support when the latter is in all other positions.

17. Conveying mechanism including a vertically reciprocable support, means for automatically intermittently reciprocating said support between predetermined limits, conveyer means carried by said support for holding an article and automatically moving the latter from one position on said support to another position thereon between successive cycles of said reciprocatory movement, said latter means being operable only when said support is disposed at the upper limit of its reciprocatory movement, and means for interrupting the movement of said conveyer means when said article reaches said last mentioned position.

ROBERT H. GORDON.